US012216932B2

(12) United States Patent
Yasin et al.

(10) Patent No.: US 12,216,932 B2
(45) Date of Patent: Feb. 4, 2025

(54) PRECISE LONGITUDINAL MONITORING OF MEMORY OPERATIONS

(71) Applicant: Intel Corporation, Santa Clara, CA (US)

(72) Inventors: Ahmad Yasin, Haifa (IL); Michael Chynoweth, Placitas, NM (US); Rajshree Chabukswar, Sunnyvale, CA (US); Muhammad Taher, Umm El Fahm (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/327,474

(22) Filed: Jun. 1, 2023

(65) Prior Publication Data

US 2023/0305742 A1    Sep. 28, 2023

Related U.S. Application Data

(63) Continuation of application No. 15/929,272, filed on Apr. 21, 2020, now Pat. No. 11,693,588, which is a
(Continued)

(51) Int. Cl.
*G06F 3/06* (2006.01)
*G06F 11/34* (2006.01)

(52) U.S. Cl.
CPC .......... *G06F 3/0656* (2013.01); *G06F 3/0604* (2013.01); *G06F 3/0653* (2013.01); *G06F 3/0673* (2013.01); *G06F 11/3466* (2013.01)

(58) Field of Classification Search
CPC .... G06F 3/0656; G06F 3/0604; G06F 3/0653; G06F 3/0673; G06F 11/3466
See application file for complete search history.

(56) References Cited

U.S. PATENT DOCUMENTS

| 5,918,005 A | 6/1999 | Moreno et al. |
| 6,216,215 B1 | 4/2001 | Palanca et al. |

(Continued)

OTHER PUBLICATIONS

Eranian, Stéphane. "What can performance counters do for memory subsystem analysis?." Proceedings of the 2008 ACM SIGPLAN workshop on Memory systems performance and correctness. (ASPLOS'08). 2008. (Year: 2008).*

(Continued)

*Primary Examiner* — Nicholas J Simonetti
(74) *Attorney, Agent, or Firm* — Nicholson De Vos Webster & Elliott LLP

(57) ABSTRACT

A processor includes a memory subunit that includes a status register and an execution engine unit to: randomly select a load operation to monitor; determine a re-order buffer identifier of the load operation; and transmit the re-order buffer identifier to the memory subsystem. Responsive to receipt of the re-order buffer identifier, the first memory subunit is to store a piece of information, related to a status of the load operation, in the status register. The processor also includes logic to, responsive to detection of retirement of the load operation, store memory information in memory-related fields of a record of a memory buffer. The memory information includes auxiliary information (AUX) and access latency information, wherein one of the auxiliary information or the access latency information includes the piece of information, from the status register, stored in a particular field of the memory-related fields.

12 Claims, 12 Drawing Sheets

Related U.S. Application Data continuation of application No. 16/177,642, filed on Nov. 1, 2018, now Pat. No. 10,649,688.

(56) References Cited

U.S. PATENT DOCUMENTS

| | | | |
|---|---|---|---|
| 7,181,723 B2 | 2/2007 | Luk et al. | |
| 7,653,727 B2 | 1/2010 | Durham et al. | |
| 8,037,465 B2 | 10/2011 | Tian et al. | |
| 8,782,629 B2 | 7/2014 | Sun | |
| 8,819,699 B2 | 8/2014 | Cota-Robles et al. | |
| 9,069,690 B2 | 6/2015 | Hildesheim et al. | |
| 9,268,611 B2 | 2/2016 | Yer et al. | |
| 9,304,811 B2 | 4/2016 | Yao | |
| 9,558,006 B2 | 1/2017 | Sasanka | |
| 10,338,834 B1 * | 7/2019 | Dighe | G06F 3/0659 |
| 2007/0226447 A1 * | 9/2007 | Shimozono | G06F 3/0644 711/170 |
| 2008/0071939 A1 * | 3/2008 | Tanaka | G06F 11/3466 714/E11.2 |
| 2008/0141002 A1 * | 6/2008 | Bhargava | G06F 11/3476 712/220 |
| 2009/0019317 A1 | 1/2009 | Quach et al. | |
| 2009/0077350 A1 * | 3/2009 | Saraswati | G06F 11/3466 712/E9.033 |
| 2014/0075123 A1 | 3/2014 | Hildesheim et al. | |
| 2014/0189302 A1 | 7/2014 | Subbareddy et al. | |
| 2015/0046506 A1 | 2/2015 | Park et al. | |
| 2015/0212822 A1 | 7/2015 | Hooker et al. | |
| 2016/0179541 A1 | 6/2016 | Gramunt et al. | |
| 2016/0232103 A1 | 8/2016 | Schmisseur et al. | |
| 2017/0093669 A1 * | 3/2017 | Nortman | H04L 43/0817 |
| 2018/0285003 A1 * | 10/2018 | Richardson | G06F 3/0683 |
| 2019/0171515 A1 | 6/2019 | Sperber et al. | |

OTHER PUBLICATIONS

Ayers, Grant, et al., "Memory Hierarchy for Web Search," In High Performace Computer Architecture (HPCA), IEEE International Symposium on High Performance Computer Architecture (HPCA), Vienna, pp. 643-656, 2018.

Dean, Jeffrey, et al., "ProfileMe: Hardware Support for Instruction-Level Profiling on Out-of-Order Processors," MICRO, Dec. 1997, 12 pages.

Gwennap, Linley, "Server Processor Competition Heats Up", Microprocessor Report, Dec. 18, 2017, pp. 1-4.

Notice of Allowance, U.S. Appl. No. 15/929,272, Apr. 29, 2022, 10 pages.

Notice of Allowance, U.S. Appl. No. 15/929,272, Mar. 14, 2023, 9 pages.

Notice of Allowance, U.S. Appl. No. 16/177,642, Jan. 10, 2020, 9 pages.

Shimpi, Anand Lal, "AMD's Phenom II X4 965 Black Edition" AnandTech, http://www.anandtech.com/show/2819/6, 9 pages, Aug. 13, 2009.

Yasin, Ahmad, "A Top-Down Method for Performance Analysis and Counters Architecture," International Symposium for Performance Analysis of System and Software (ISPASS), v1.02, Mar. 2014, 10 pages.

* cited by examiner

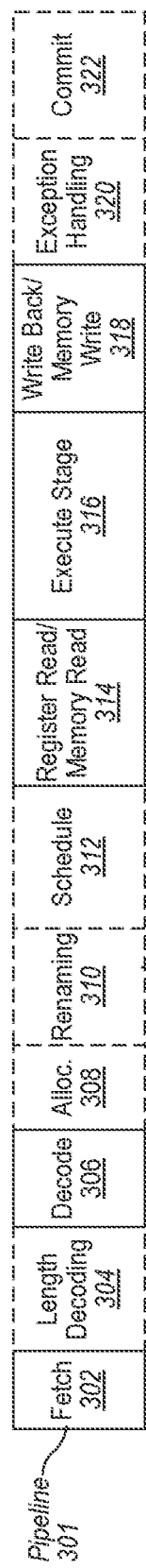
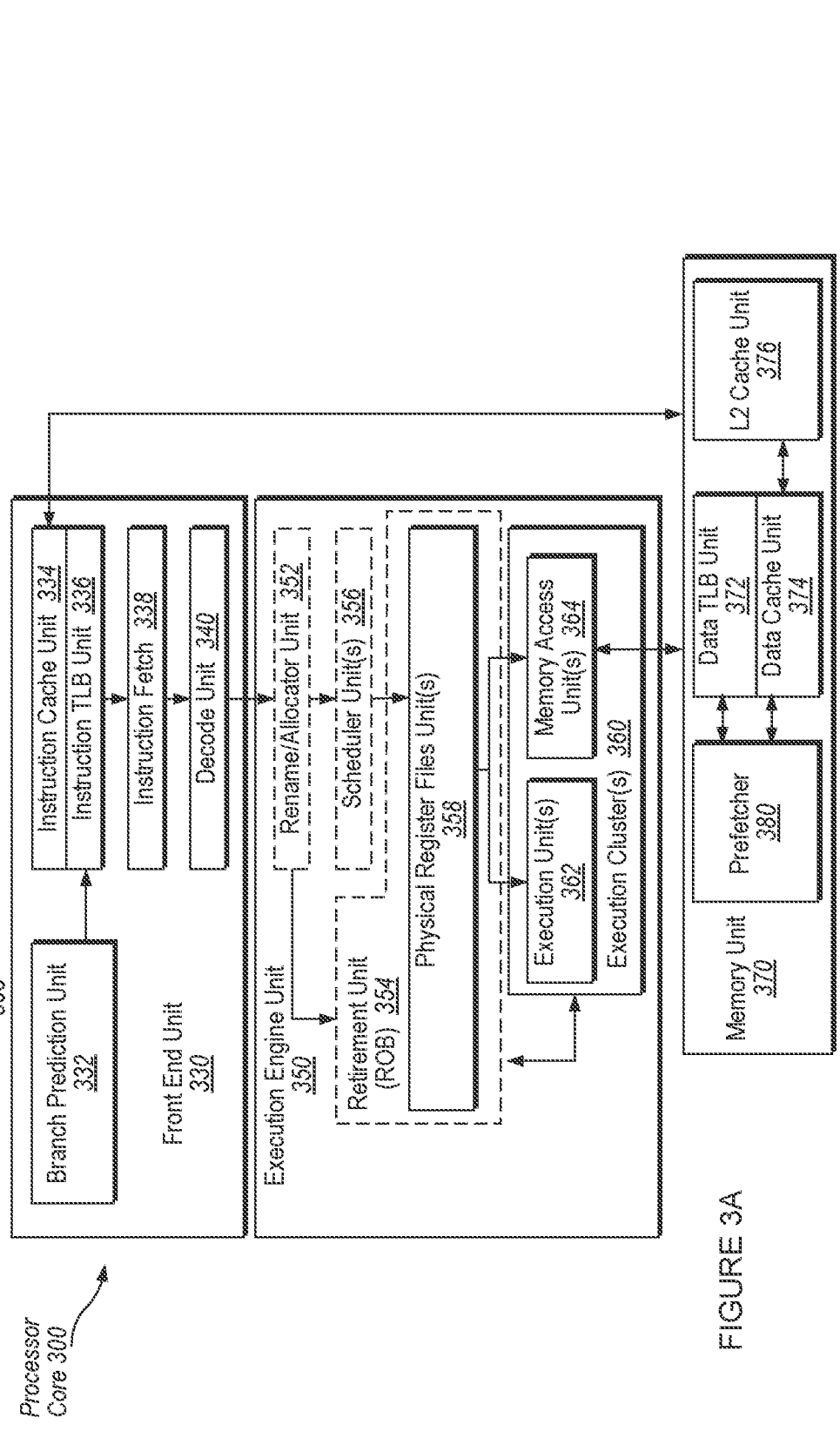
FIGURE 3B
FIGURE 3A

PRECISE LONGITUDINAL MONITORING OF MEMORY OPERATIONS

TECHNICAL FIELD

Embodiments of the disclosure relate generally to performance monitoring, and more specifically, but without limitation, to precise longitudinal monitoring of memory operations.

BACKGROUND

Performance analysis is the foundation for characterizing, debugging, and tuning a microarchitectural design, finding and fixing performance bottlenecks in hardware and software, as well as locating avoidable performance issues. As the computer industry progresses, the ability to analyze the performance of a microarchitecture and make changes to the microarchitecture based on that analysis becomes more complex and important.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3A is a block diagram illustrating microarchitecture for a processor according to an embodiment.

FIG. 3B is a block diagram illustrating an in-order pipeline and a register renaming stage, out-of-order issue/execution pipeline according to an embodiment.

DETAILED DESCRIPTION

The embodiments described herein are directed to performance monitoring (PerfMon), also referred to as profiling, of micro-architectural design to characterize, debug, and tune the design, find and fix performance bottlenecks in hardware and software, as well as locate avoidable performance issues. Performance monitoring generally seeks to count some event (e.g., cache access) and tag that information to particular instructions to which software can relate, e.g., particular memory operations performed in association these instructions.

In one embodiment, Precise Event Based Sampling (PEBS) is a feature available to a subset of events that allows the hardware to collect additional information very close to the exact time the configured event overflowed. Monitoring based on PEBS takes an arbitrary point in time access and tries to see what instructions are being executed at that time that may be contributing to a particular event. This is known as vertical profiling. The present disclosure relates to horizontal profiling, e.g., randomly selecting an instruction from an instruction stream, and saving information about what that instruction does and how other related or dependent instructions may impact the instruction as time passes.

The disclosed microarchitecture and methods may provide performance monitoring information including stall reasons and penalties of memory accesses, with respect to loads in particular, in high-performance out-of-order (OOO) cores. Such information can map offending memory accesses to the precise instructions triggering the offending memory accesses. This information can aid performance engineers to optimize and tune performance of demanding workloads on multi-core platforms. Optimization efforts have increased as more speedup is derived from microarchitecture design and software tuning.

Figure 2:
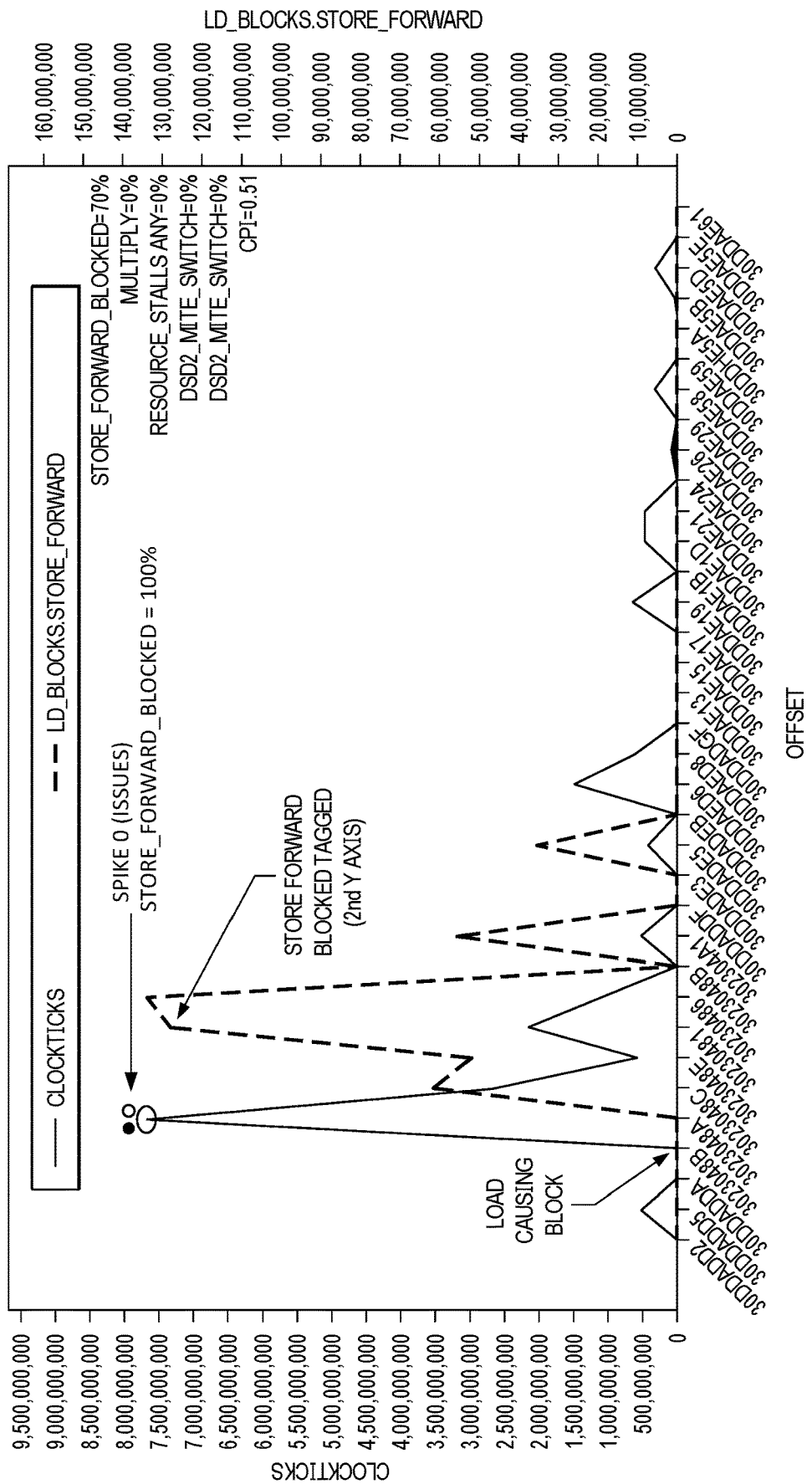
FIG. 2 is a graph that illustrates a problem of locating load blocks and determining penalties.

For example, there are a number of challenges with identifying and fixing load blocks from being forwarded from an earlier store in performance monitoring technology. It is difficult to identify the exact load that is blocked because the load block events tend to skid few cycles away from the problematic load, as illustrated in FIG. 2. For example, in a skid of eight cycles there can be up to 40 load operations in a five-wide processor core. FIG. 2 illustrates that the load which is blocked occurs three to eight instructions before the event that identifies (e.g., tags) the store forward blocked due to skid. Skid in PEBS refers to delay in time between stopping the processor and recording the state information from the processor. There may be many other load operations within the three-to-eight-instruction window that may incur the store forward blocked penalty. It is therefore difficult to identify the store operation involved in the load blocked case.

In order to fix the load block case, it may be necessary to understand not only the location of the load that is blocked but also the store that is responsible for the load being blocked. It is difficult to determine the cost of load block cases such as due to a store forward, as the penalty may be partially reliant on the latency of the store. For example, a store that misses in the last level cache can push out the blocked load until the cache line containing the store is fetched from memory. There is a high hardware cost in an implementation that aims to make all of the various load block cases precise using traditional precise mechanisms such as PEBS. Furthermore, non-precise performance monitoring and static software analysis are also insufficient.

More specifically, non-precise events may lead to error in detecting the correct load operation due to skid as well as speculative accesses. The event may not be tagged to the right instructions in such cases. Finding store forward blocks statically in code identifies only a subset of the cases that are impacting performance. Software-based solutions may also fail whenever a microarchitecture condition is involved in blocking load operations, e.g., if some store address was not yet resolved by the time the load operation is executed.

Turning the current load block from non-precise events into precise events would have some added disadvantages in that doing so may fail to account for the latency or cost of the load block.

There are also hardware implementation costs for making additional PEBS events. For example, various block and latency states would have to be tracked in critical structures, like in the re-order buffer, for micro-operations (μops).

Simultaneous collections of several events may present additional challenges. For example, much information may be needed to properly analyze a performance issue, such as a load address, a data-source (e.g., L2 hit, L3 hit, and the like), a block condition (store forward, unknown data, unknown address) and other information (such as existence of a lock, split, translation lookaside buffer information, and the like). Due to shortages in the number of general counters, event-based solutions (precise or not), mandate software tools do multiple runs of the workload or counter multiplexing, compromising the fidelity of the profiling data.

To resolve these challenges, the disclosed microarchitecture may employ processor units that record various data for a monitored transaction, e.g., precise longitudinal monitoring of memory loads. A single transaction may be randomly selected for monitoring. An out-of-order unit may track instruction latency in cycles, an address generation unit record a data load address (DLA) into a register, a data cache unit (DCU) may track cache latency, a memory ordering buffer (MOB) may track block conditions, and other memory subunits may track additional information. A profiling tool (e.g., a software tool) may sample and attribute the information to particular instructions. For example, a store-unknown-address-block bit may inform whether a load operation at a given instruction pointer (e.g., EventingIP or Instruction Pointer in PEBS) cannot forward from an earlier store operation. The DLA of the load operation may help to identify the particular offending store operation. The difference of instruction latency and the cache latency may determine the penalty of that block. This allows performance-critical contentions to be identified and fixed in software (e.g., by prioritizing the load operation above the store operation). Additional sources of information and data will be discussed.

In one embodiment, a processor may include a memory subsystem with multiple memory subunits, each which includes a status register. An execution engine unit may be coupled to the memory subsystem and be adapted to: randomly select a load operation to monitor; determine a re-order buffer identifier of the load operation; and transmit the re-order buffer identifier to the memory subsystem. Responsive to receipt of the re-order buffer identifier, each memory subunit of the memory subsystem may store a piece of information, related to a status of the load operation, in its status register. Such pieces of information were just discussed by way of example. The processor may further, in response to detection of the retirement of the load operation, retrieve the pieces of information from the various status registers and store each piece of information from corresponding status registers into a particular field of a record of a memory buffer. In one embodiment, the processor also checks that the load operation has undergone threshold latency in execution before retrieving and storing the pieces of information into the fields of the record of the memory buffer. The particular field may be associated with a corresponding memory subunit or a particular type of information obtained from the corresponding memory subunit. Additional information may also be written into the record such as a counter value for an instruction latency counter and a data access address of the load operation. See Table 1 for a more complete list of information that may be stored in a record of the memory buffer.

In various embodiments, the disclosed microarchitecture and methods for longitudinal monitoring of memory operations may provide the exact instruction pointer (without skid of the load operation) that is blocked due to the precise nature of a load latency event. A priori random selection of the load operation may help to avoid skid (or bias) from counter overflow until retirement is stopped or if multiple pops retire in a given cycle.

Furthermore, the disclosed microarchitecture and methods may collect much different information for one transaction. In PEBS, a programmer may choose the event to focus on and collect just this information for many instructions. If a first load operation experienced an event, results of the PEBS monitoring may not be able to tell if another load operation experienced that same event, or determine the latency of the first load operation.

The disclosed microarchitecture and methods may also identify a particular address for the instruction, so the microarchitecture may determine what other instruction last wrote to this address. With this information, the microarchitecture may then see dependencies between instructions. For example, the microarchitecture may include means to determine the store operation which generated the load block situation through investigating the DLA as well as addresses of the registers that are included in the record of the memory buffer.

The latencies of the load may be determined by being integrated into a load-latency facility, where instruction latency measures overall time including instruction dependencies and memory ordering checks. In one embodiment, the load-latency facility is hardware that records latency of a load and that may, as a result, estimate from where the load is arriving, e.g., a particular level of cache or from memory, or the like, associated with a particular latency. Cache latency may measure only the memory subsystem time for serving that request. The difference between the instruction (e.g., load) latency and the cache latency may be useful in determining memory operation blocks for which no cache misses are involved.

Furthermore, the disclosed microarchitecture and methods may incur lower hardware implementation costs by employment of longitudinal (as opposed to event-based) profiling. The microarchitecture and methods may enable tracking a single transaction at a time with distributed recording of monitoring information. Hence, there is no requirement for a per-entry state in critical processor structures, for at-retirement tagging, and/or for expensive mechanisms to avoid skid.

Additionally, the disclosed microarchitecture and methods may enjoy atomicity and fidelity of the profiling data as the information is coherent and relates to a particular transaction as an instruction is executed. In contrast, event-based sampling may collect information across different runs or stitch information from different transactions due to counter multiplexing.

Figure 1:
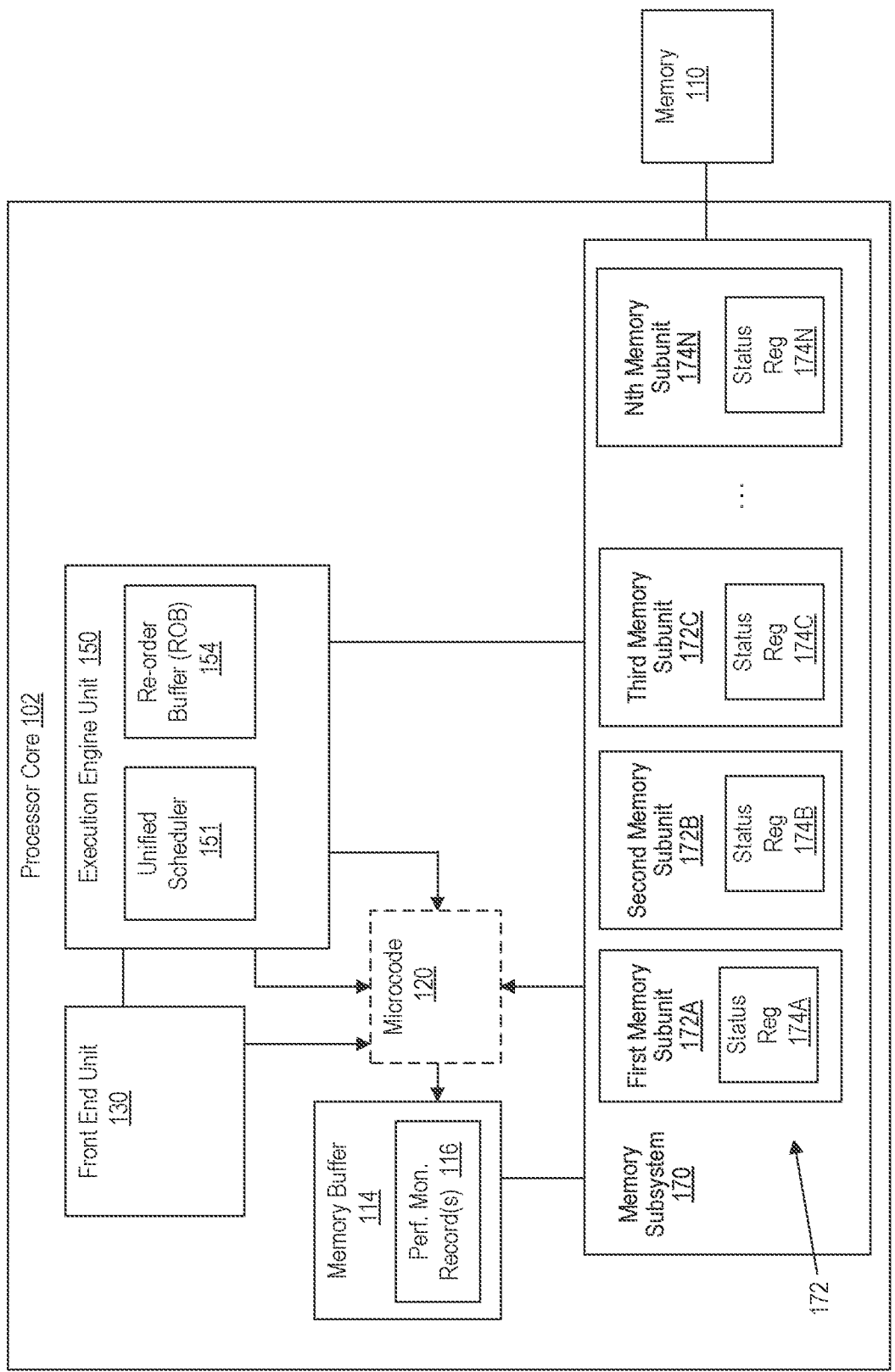
FIG. 1 is a block diagram of system microarchitecture according to various embodiments.

FIG. 1 is a block diagram of system microarchitecture 100 that is capable of precise longitudinal monitoring of memory operations according to various embodiments. In an embodiment, the system microarchitecture 100 is a processor, a system-on-a-chip (SoC), or other processing device, which may be implemented on a single die (a same substrate) and within a single semiconductor package. The system microarchitecture 100 may be instantiated as a central processing unit (CPU), a graphics processing unit (GPU), or the like.

Referring to FIG. 1, the system microarchitecture 100 may include multiple cores, of which a processor core 102 is represented by way of explanation, and memory 110. The processor core 102 may contribute to out-of-order (OOO) processing clusters of the system microarchitecture 100. In various embodiments, the processor core 102 includes a memory buffer 114, which includes multiple performance monitoring records 116 (e.g., memory buffer records containing performance monitoring data), and optional microcode 120 executable by the processor core 102 (or other logic) to populate the memory buffer 114 and interface with software. The memory buffer 114 may be computer storage expected to be present on the processor core 102, whether volatile or non-volatile, persistent or non-persistent, random access memory (RAM), flash memory, or the like. In an alternative embodiment, at least a part of the memory buffer 114 is stored in the off-chip memory 110. The processor core 102 may further include a front end unit 130 for branch prediction, instruction cache, instruction fetch, and that may include a decode unit to decode fetched instructions, as will be discussed in more detail with reference to FIG. 3.

With continued reference to FIG. 1, the system microarchitecture 100 may further include an execution engine unit 150 and a memory subsystem 170. The execution engine unit 150 may include a number of components that will be discussed in more detail with reference to FIG. 3, and may include a unified scheduler 151, also known as a reservation station (RS), and a retirement unit, also known as a reorder buffer (ROB) 154. The unified scheduler 151 may be a decentralized feature of the microarchitecture of a CPU that allows for register renaming, and may be used by the Tomasulo algorithm for dynamic instruction scheduling. The ROB 154 may reorder instructions that retire into program order, so that despite some instructions being executed out of order, data that result from their execution is reordered properly. Additional or different execution subunits may also make up the execution engine unit 150.

In various embodiments, the memory subsystem 170 includes multiple memory subunits 172, including a first memory subunit 172A, a second memory subunit 172B, a third memory subunit 172C, and so forth until an Nth memory subunit 172N. Each memory subunit may include a status register (e.g., a temporal register, a scratch control register (SCR), or the like), respectively a first status register 174A, a second status register 174B, a third status register 174C, and so forth until an Nth status register 174N. What these memory subunits may represent will be discussed in more detail with reference to FIGS. 2, 3A-3B, and 4. One will appreciate that there may be more or fewer than the number of memory subunits depicted in FIG. 1, as these are illustrated merely by way of example and for purpose of explanation.

In one embodiment, the execution engine unit 150 may be coupled to the memory subsystem 170 and be adapted to: randomly select a load operation to monitor; determine a re-order buffer identifier of the load operation; and transmit the re-order buffer identifier to the memory subsystem 170. Responsive to receipt of the re-order buffer identifier, each memory subunit 172A, 172B, 172C, . . . 172N may store a piece of information, related to a status of the load operation, in its status register 174A, 174B, 174C, . . . 174N, respectively. The processor core 102 may further execute the microcode 120 (or other logic) to: detect retirement of the load operation; and, in response to detection of the retirement of the load operation, store each piece of information from corresponding status registers 174A, 174B, 174C, . . . 174N into a particular field of a record of the memory buffer 114, e.g., one of the performance monitoring records 116. In an alternative embodiment no microcode is executed and so the respective memory subunits may detect retirement of the load operation and directly store each piece of information from corresponding status registers into the particular field of the record of the memory buffer 114.

In embodiments, the particular field of the performance monitoring record 116 may be associated with a corresponding memory subunit or a particular type of information obtained from the corresponding memory subunit, as will be discussed with more detail with reference to FIGS. 4-5. Additional information may also be written into the performance monitoring record 116 such as a counter value for an instruction latency counter and a data access address of the load operation. Table 1 contains a more complete list of information that may be stored in a performance monitoring record 116 of the memory buffer 114, although additional or different information or data may be stored in alternative embodiments.

TABLE 1

Example Performance Monitoring Record

| Offset | Group name | Field name | Bits | Details |
|---|---|---|---|---|
| 0x0 | Basic | Record Format | [47:0] | |
| | | Record Size | [63:48] | |
| 0x8 | | Instruction Pointer | | EventingIP |
| 0x10 | | TSC | | |
| 0x18 | | Applicable Counters | | |
| 0x20 | Memory | Access Address (DLA) | | DLA |
| 0x28 | | Auxiliary Info (AUX) | [3:0] | DATA_SRC |
| | | | [5][4] | Lock, DTLB-miss |
| | | | [6] | STORE_FWD_BLK |
| | | | [7] | STORE_ADDR_BLK |
| 0x30 | | Access Latency | [15:0] | Instruction Latency |
| 0x34 | | | [47:32] | Cache Latency |
| 0x38 | | TSX Info | | TSX Information |

The information or data stored within the exemplary record of Table 1, which may be stored in the memory buffer 114, includes basic data and memory-related data. The basic data may include record format and record size, the instruction pointer of the instruction (e.g. memory operation), a time stamp counter (TSC) value, and additional applicable counters. The memory-related fields may include an access address (e.g., a data load address, or DLA), auxiliary information, access latency, and other transaction information related to Transaction Synchronization Extensions (TSX) architecture. The auxiliary information may include data stored in a scratch control register (SRC), lock data or indications of translation lookaside buffer (DTLB) misses/ hits, whether there has been a store forward block of a load operation (STORE_FWD_BLK), and whether there has been an unknown store address block of a load operation (STORE_ADDR_BLK), both of which will be discussed in more detail. For example, the piece of information may be whether the load operation is blocked due to an address collision with an earlier store operation. The access latency information, stored in access latency fields, may include a value for instruction latency (e.g., an instruction latency value) and a value for cache latency (e.g., a cache latency value). The difference between the instruction latency and the cache latency may account for delay due to a block event.

Accordingly, engineers may inspect latencies for different instructions, and make comparisons between these latencies. If engineers see higher-than-expected latencies, and correlate the block (BLK) bits of the auxiliary information in the record of Table 1, then one may determine the kind of block or instructions that may be causing the latency. Certain types of block events may explain corresponding cases of higher latencies, as discussed herein.

FIG. 3A is a block diagram illustrating microarchitecture for a processor core 300 that implements the processing device including heterogeneous cores in accordance with one embodiment. Specifically, the processor core 300 depicts an in-order architecture core and a register renaming logic, out-of-order issue/execution logic to be included in a processor according to at least one embodiment of the disclosure. In one embodiment, the processor core 300 is an extension or more-detailed version of the processor core 102 of FIG. 1.

In various embodiment, the processor core 300 includes a front end unit 330 coupled to an execution engine unit 350, and both are coupled to a memory unit 370. The processor core 300 may include a reduced instruction set computing (RISC) core, a complex instruction set computing (CISC) core, a very long instruction word (VLIW) core, or a hybrid or alternative core type. As yet another option, the processor core 300 may include a special-purpose core, such as, for example, a network or communication core, compression engine, graphics core, or the like. In one embodiment, the processor core 300 may be a multi-core processor or may be part of a multi-processor system.

In embodiments, the front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 340 may be implemented using various different mechanisms. Examples of suitable mechanisms include, but are not limited to, look-up tables, hardware implementations, programmable logic arrays (PLAs), microcode read only memories (ROMs), and the like. The instruction cache unit 334 is further coupled to the memory unit 370. The decode unit 340 is coupled to a rename/ allocator unit 352 in the execution engine unit 350.

In embodiments, the execution engine unit 350 includes the rename/allocator unit 352 coupled to a retirement unit 354, also known as a re-order buffer (ROB), and a set of one or more scheduler unit(s) 356. The scheduler unit(s) 356 represents any number of different schedulers, including reservations stations (RS), central instruction window, and the like. In one embodiment, the rename/allocator unit 352 and the scheduler unit(s) 356 may together perform the function of the unified scheduler 151 of FIG. 1. The scheduler unit(s) 356 may be coupled to the physical register file(s) unit(s) 358. Each of the physical register file(s) units 358 may represent one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 358 may be overlapped by the retirement unit 354 to illustrate various ways in which register renaming and out-of-order execution may be implemented (e.g., using a re-order buffer and a retirement register file(s), using a future file(s), a history buffer(s), and a retirement register file(s); using a register maps and a pool of registers; and the like.).

Generally, the architectural registers are visible from the outside of a processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, and the like. The retirement unit 354 and the physical register file(s) unit(s) 358 are coupled to the execution cluster(s) 360. The execution cluster(s) 360 may include a set of one or more execution units 362 and a set of one or more memory access units 364. The execution units 362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest may be in-order.

The set of memory access units 364 may be coupled to the memory unit 370, which may include a data prefetcher 380, a data TLB unit 372 (e.g., DTLB), a data cache unit (DCU) 374, and a level 2 (L2) cache unit 376, to name a few examples. In some embodiments the DCU 374 is also known as a first level data cache (L1 cache). The DCU 374 may handle multiple outstanding cache misses and continue to service incoming stores and loads. It may also support maintaining cache coherency. The data TLB unit 372 may be a cache used to improve virtual address translation speed by mapping virtual and physical address spaces. In one exemplary embodiment, the memory access units 364 may include a load unit, a store address unit, and a store data unit, each of which is coupled to the data TLB unit 372 in the memory unit 370. The L2 cache unit 376 may be coupled to one or more other levels of cache and eventually to a main memory, e.g., the memory 110 of FIG. 1.

In one embodiment, the data prefetcher 380 speculatively loads/prefetches data to the DCU 374 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor core 300 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture as well. While the illustrated embodiment of the processor core 300 also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 3B is a block diagram illustrating an in-order pipeline and a register renaming stage, out-of-order issue/execution pipeline implemented by processor core 300 of FIG. 3A according to some embodiments. The solid lined boxes in FIG. 3B illustrate an in-order pipeline, while the dashed lined boxes illustrates a register renaming, out-of-order issue/execution pipeline. In FIG. 3B, a processor core 300 as a pipeline includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324. In some embodiments, the ordering of stages 302-324 may be different than illustrated and are not limited to the specific ordering shown in FIG. 3B.

Figure 4:
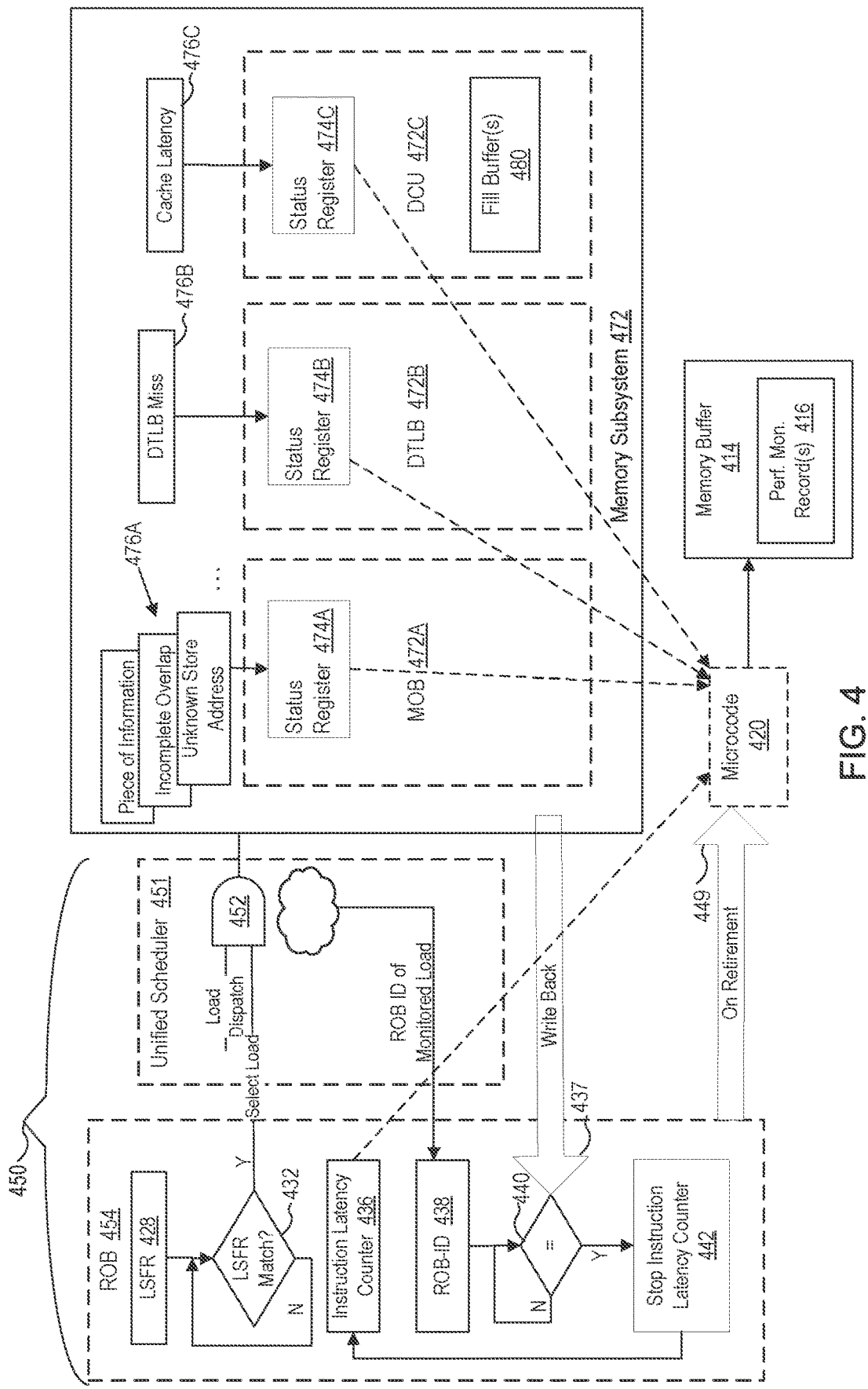
FIG. 4 is a block diagram illustrating system microarchitecture and functionality of longitudinal profiling of a load operation selected for monitoring according to an embodiment.

FIG. 4 is a block diagram illustrating system microarchitecture 400 and functionality of longitudinal profiling of a load operation selected for monitoring according to an embodiment. Components of the system microarchitecture 400 of FIG. 4 may carry corresponding numbering to those of the system microarchitecture 100 of FIG. 1, and thus the processor core 102 may be understood to include the system microarchitecture 400 in some embodiments. The system microarchitecture 400 may include an execution engine unit 450 that is to interface with and monitor memory operations passing through a memory subsystem 472.

In one embodiment, the execution engine unit 450 may include a re-order buffer (ROB) 154 and a unified scheduler 451. The ROB 454 may include a linear feedback shift register (LSFR) 428 (or other random number generator) that may generate a random number. If the random number matches the current cycle number, which is the current stage in the hardware pipeline, then the ROB 454 may select the load operation that occurs within the instruction in that cycle (432). This selection may occur once per thread that the processor core 102 is executing (or more often in other embodiments). The unified scheduler 451 has scheduled the load operation, which may dispatch the load operation by function of an AND gate 452 within the unified scheduler 451. The execution engine unit 450 may also determine a re-order buffer identifier (ROB ID) of the load operation, and transmit the ROB ID to the memory subsystem 472. It is by reference to the ROB ID that the execution engine unit 450 can monitor progress and completion of the load operation. The ROB 454 may further include an instruction latency counter 436, which may be started when the load operation is dispatched, and thus has begun to be processed.

The memory subsystem 472 may include a number of memory subunits, as in the system microarchitecture 100 of FIG. 1. By way of example, and for purposes of explanation, the memory subsystem 472 may include a memory ordering buffer 472A, a data TLB (DTLB) 472B, and a DCU 472C, which may in turn include a first status register 474A, a second status register 474B, and a third status register 474C, respectively. Additional and/or different memory subunits are envisioned.

In various embodiments, the memory subunits may receive or detect certain pieces of information (which may include certain events) that provide a status of the load operation during execution. These pieces of information are identified as first data 476A, second data 476B, and third data 476C, corresponding respectively to the MOB 472A, the DTLB 472B, and the DCU 472C. For example, the first data 476A for the MOB 472A may include detection of an incomplete overlap between the load operation and a store operation on which the load operation is dependent, or detection of an unknown store address. Furthermore, the second data 476B of the DTLB 472B may include one of presence or absence of a DTLB miss or a DTLB hit. Additionally, the third data 476C of the DCU 472C may include cache latency. The DCU 472C may include one or more fill buffer(s) that may be monitored in certain ways (to be discussed below) that impact the cache latency. These pieces of information, including the first data 476A, the second data 476B, and the third data 476C may be recognized among the data stored to the performance monitoring record such as illustrated in Table 1.

In one embodiment, responsive to receipt of the re-order buffer identifier (ROB ID), the MOB 472A may store the first data 476B, related to a status of the load operation, in the first status register 474A; the DTLB 472B may store the second data 476B in the second status register 474B; and the DCU 472C may store the third data 476C in the third status register 476C. In this way, the pieces of information associated with the status of the load operation for each of the multiple memory subunits are temporarily stored as performance monitoring data in respective status registers.

With continued reference to FIG. 4, the ROB ID of the load operation may be returned from the unified scheduler 451 upon being randomly selected for monitoring, which is also retained within the ROB 454 awaiting retirement, e.g., in advance of detection of the write back of the load operation (438). When the write back to the ROB 454 of the load operation occurs, indicating completion of the load operation (437), the ROB 454 may determine whether the ROB ID of the write back is a match for the monitored load and for which the instruction latency counter 436 was initiated (440). If so, the ROB 454 may stop the instruction latency counter (442). The counter value of the instruction latency counter 436 may now reflect the instruction latency for the monitored load operation.

In embodiments, the processor core 102 may execute microcode 420 (or other logic) to detect retirement of the load operation (449). The processor core 102 may further execute the microcode 420 (or other logic) to, in response to detection of the retirement of the load operation, store the piece of information (or data) from each of the first status register 474A, second status register 474B, and third status register 474C, as well as the counter value from the instruction latency counter 436, into corresponding fields of a performance monitoring record 416 of a memory buffer 414 (see Table 1). Each field may correspond to a type of data stored in each respective status register, for example. A performance monitoring tool that the processor core executes as software may then retrieve the data from the performance monitoring record 416. In an alternative embodiment, no microcode is executed as the memory subunits and the ROB 454 (and possibly other hardware that buffers such pieces of information) may be configured to directly detect the retirement of the load operation and store the pieces of information into respective fields of the performance monitoring record 416.

In various embodiments, there may be two sample precise block events that are of particular focus. Upon detection that the load operation is blocked by a preceding store forward operation with an overlapping linear address (e.g., when a LD_BLOCKS.STORE_FORWARD event fires), the MOB 472A may set a bit of the first status register 474A. In this scenario, the overlapping linear address may prevent the store operation to forward the data required by the load operation. In a second precise block event, upon detection that the load operation is blocked by an unknown linear store address (e.g., when a SB_BLOCKS.STORE_ADDR_BLK event fires, where "SB" stands for store buffer), the MOB 472A may set a different bit (e.g., bit 23 that may be called STORE_ADDR_BLK) in the first status register 474A. This second scenario may also arise if memory disambiguation has been disabled, during memory disambiguation training, or when hardware watchdog is activated. A hardware watchdog is a feature included on many computers, whose purpose is to reboot the computer automatically in case the system hangs. Once the watchdog is activated, it is to receive a ping at regular intervals from the system, and, if the hardware watchdog does not, the hardware watchdog will cause a hardware reset.

The system microarchitecture 400 may further include a cache latency implementation, e.g., specific load-to-use embodiments. A 16-bit (or other value) saturating counter may be present in core clocks for load operations monitored by the present micro-architecture. The duration of a cache-miss interval may be defined, per each of: (i) from fill buffer allocation by monitored load; (ii) from monitored load hit (squashed) into a fill buffer allocated by some earlier request, e.g., of an earlier dispatched instruction; and (iii) from a homeless prefetch issued as a result of monitored load when the fill buffer has no room. The term squashed is to say that the load operation merges into an existing fill buffer.

In the above-described cache latency embodiments, the cache miss latency counter may stop on monitored load writeback in the above-listed cases. The default latency, e.g., with no cache miss, may be five ("5") clock cycles, the L1 cache hit latency of the processor core 102. If the monitored load completes without allocating/merging into a fill buffer, the counter should reset to a value of five clock cycles. Further, the cache latency on "hit" of the cache may be five clock cycles and the cache latency on a miss of the cache may be some value greater than five clock cycles. On JEClear, e.g., branch mispredict, the 16-bit saturating counter may be reset if the JEclear is older than the monitored load. For memory renaming, a load check may update the counter value to zero, which may indicate an even shorter latency to software.

Figure 5:
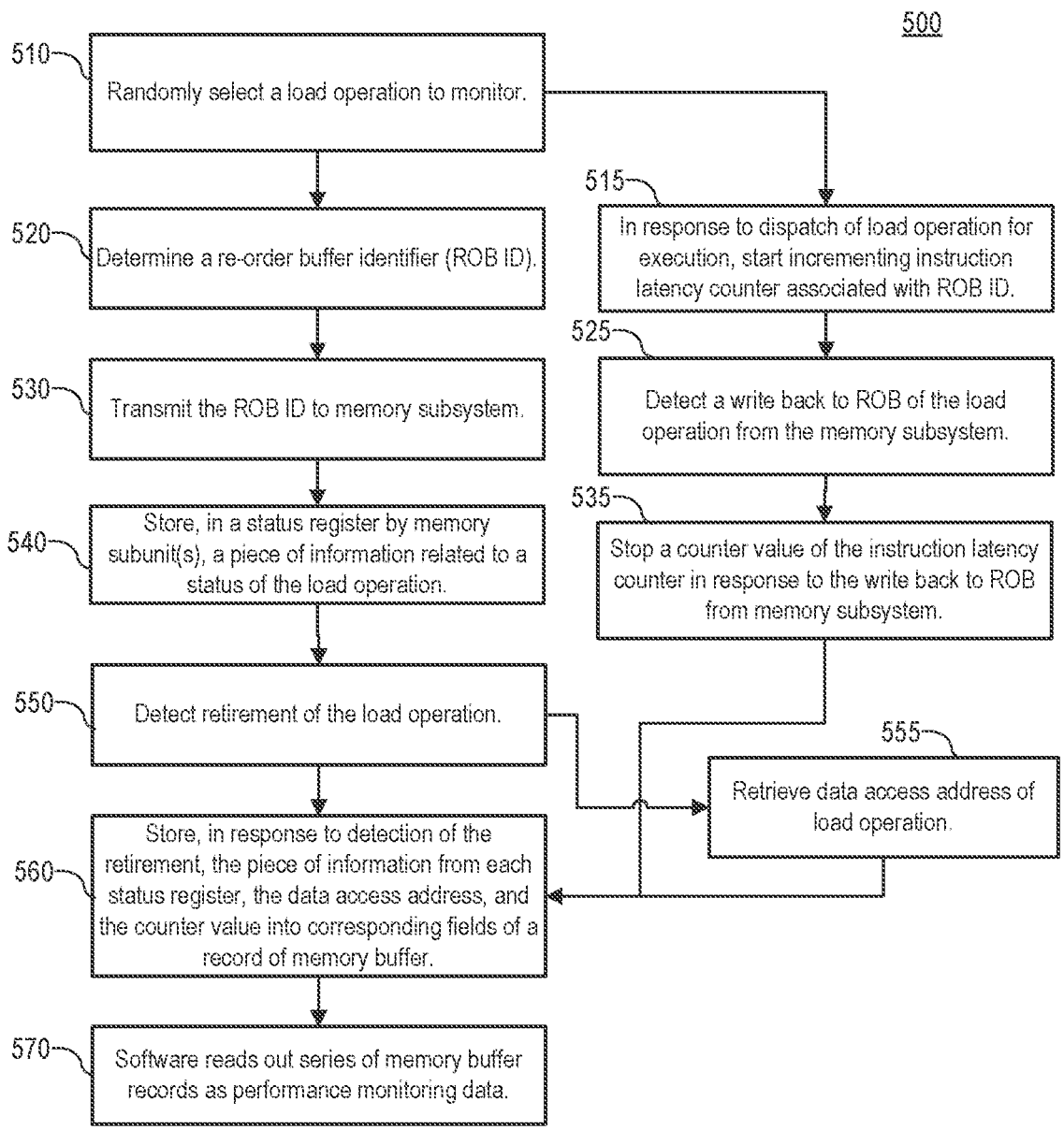
FIG. 5 is a flow chart of a method for precise longitudinal monitoring of memory load operations according to various embodiments.

FIG. 5 is a flow chart of a method 500 for precise longitudinal monitoring of memory load operations according to various embodiments. The method 500 may be performed by processing logic that may include hardware (e.g., circuitry, dedicated logic, programmable logic, microcode, etc.), software (such as instructions run on a processing device, a computer system, or a dedicated machine), firmware, or a combination thereof. In one embodiment, the method 500 may be performed, in part, by the processor core 102 described above with respect to FIG. 1.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 5, the method 500 may begin with the processing logic randomly selecting a load operation to monitor (510). The method 500 may continue with the processing logic determining a re-order buffer identifier of the load operation (520). The method 500 may continue with the processing logic transmitting the re-order buffer identifier to the memory subsystem (530).

In some embodiments, the method 500 may continue with the processing logic, in response to dispatch of the load operation for execution, starting to increment an instruction latency counter associated with the re-order buffer identifier (515). The method 500 may continue with the processing logic detecting a write back to the re-order buffer of the load operation from the memory subsystem, designating completion of the load operation (525). The method may continue with the processing logic stopping a counter value of the instruction latency counter in response to the write back to the re-order buffer from the memory subsystem (535).

With continued reference to FIG. 5, the method 500 may continue with the processing logic storing in a status register, by respective memory subunit(s) of the memory subsystem responsive to receipt of the re-order buffer identifier, a piece of information related to a status of the load operation (540). The method 500 may continue with the processing logic detecting retirement of the load operation (550). The method 500 may continue with the processing logic retrieving a data access address (e.g., DLA) of the load operation (555). The method 500 may continue with the processing logic storing, in response to detecting the retirement of the load operation, each piece of information from respective status registers, the data access address, and the counter value into corresponding fields of a record of a memory buffer (560). Each field may be associated with a different memory subunit, as per exemplary record in Table 1. The method 500 may continue with software reading out a series of memory buffer records, to include the record referenced at block 560, as performance monitoring data (570).

Figure 6:
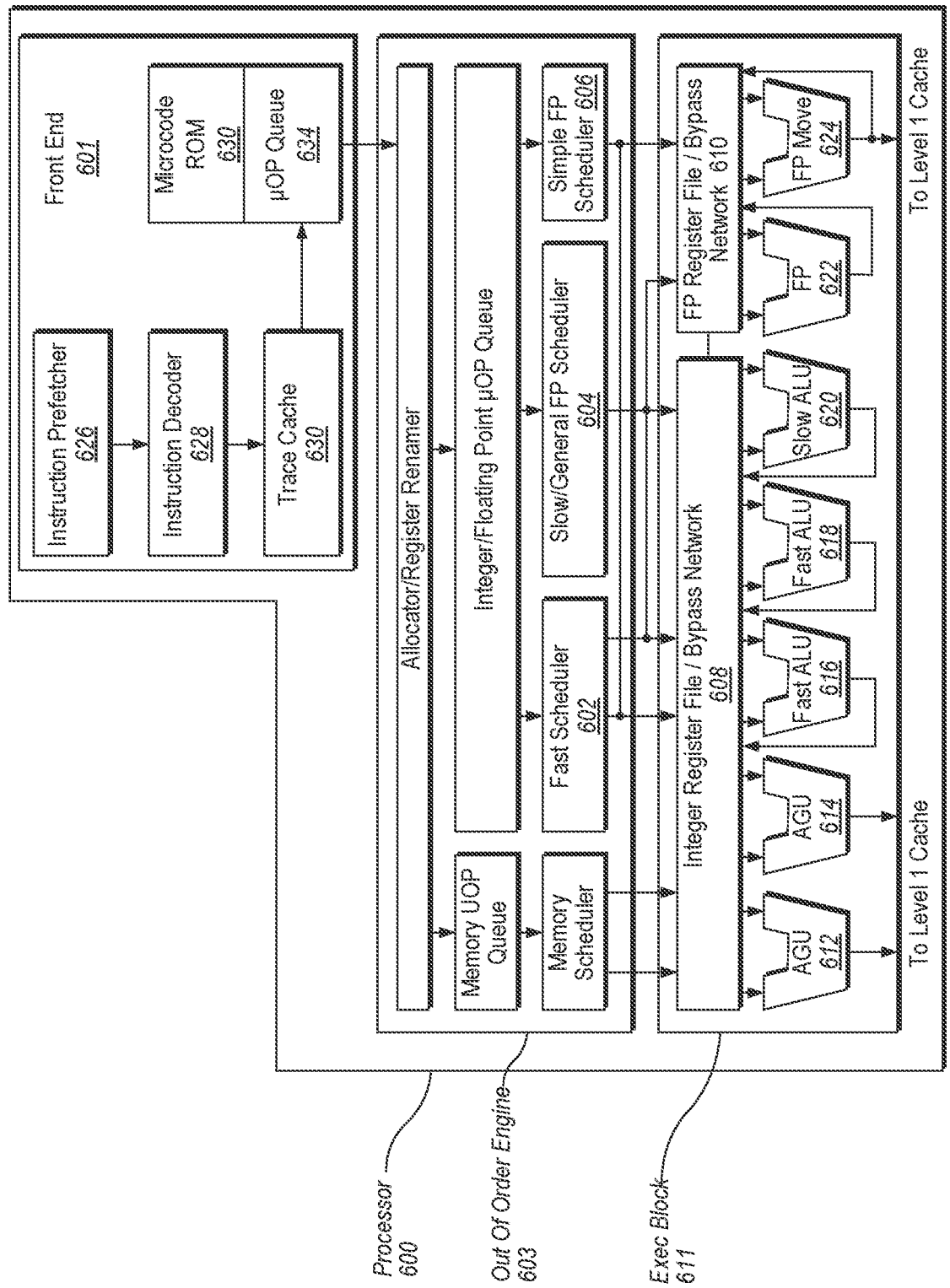
FIG. 6 is a block diagram illustrating microarchitecture for a processor in accordance with one embodiment.

FIG. 6 illustrates a block diagram of the microarchitecture for a processor 600 (e.g., processing device 60) that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or μops) that the machine can execute. In other embodiments, the decoder parses the instruction into an opcode and corresponding data and control fields that are used by the microarchitecture to perform operations in accordance with one embodiment. In one embodiment, the trace cache 630 takes decoded μops and assembles them into program ordered sequences or traces in the μop queue 634 for execution. When the trace cache 630 encounters a complex instruction, the microcode ROM 632 provides the μops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each μop needs in order to execute. The register renaming logic renames logic registers onto entries in a register file. The allocator also allocates an entry for each μop in one of the two μop queues, one for memory operations and one for non-memory operations, in front of the instruction schedulers: memory scheduler, fast scheduler 602, slow/general floating point scheduler 604, and simple floating point scheduler 606. The μop schedulers 602, 604, 606, determine when a μop is ready to execute based on the readiness of their dependent input register operand sources and the availability of the execution resources the μops need to complete their operation. The fast scheduler 602 of one embodiment can schedule on each half of the main clock cycle while the other schedulers can only schedule once per main processor clock cycle. The schedulers arbitrate for the dispatch ports to schedule μops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent μops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the µops schedulers 602, 604, 606, dispatch dependent operations before the parent load has finished executing. As pops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, California. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
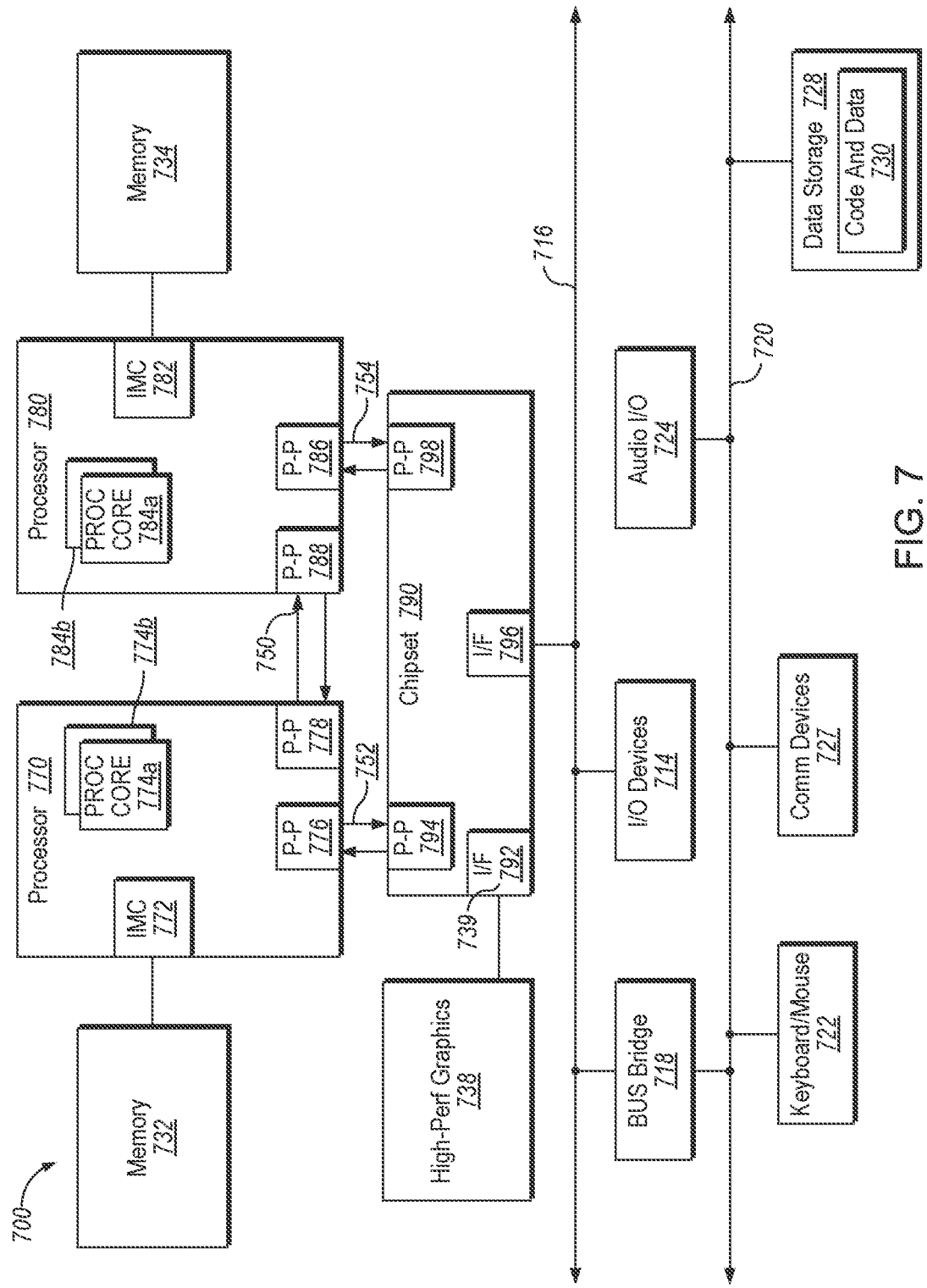
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As illustrated in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
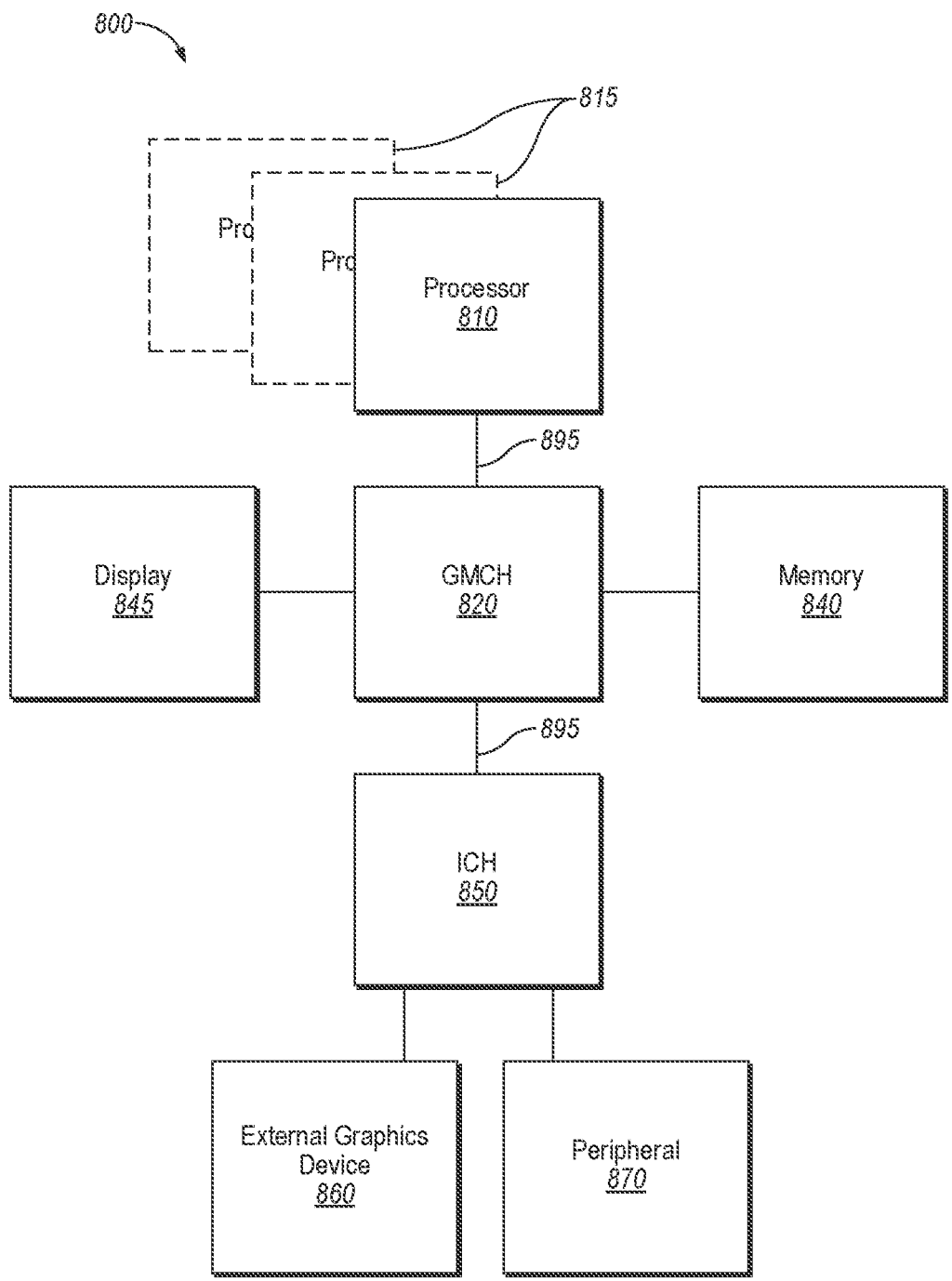
FIG. 8 is a block diagram illustrating a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800.

For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
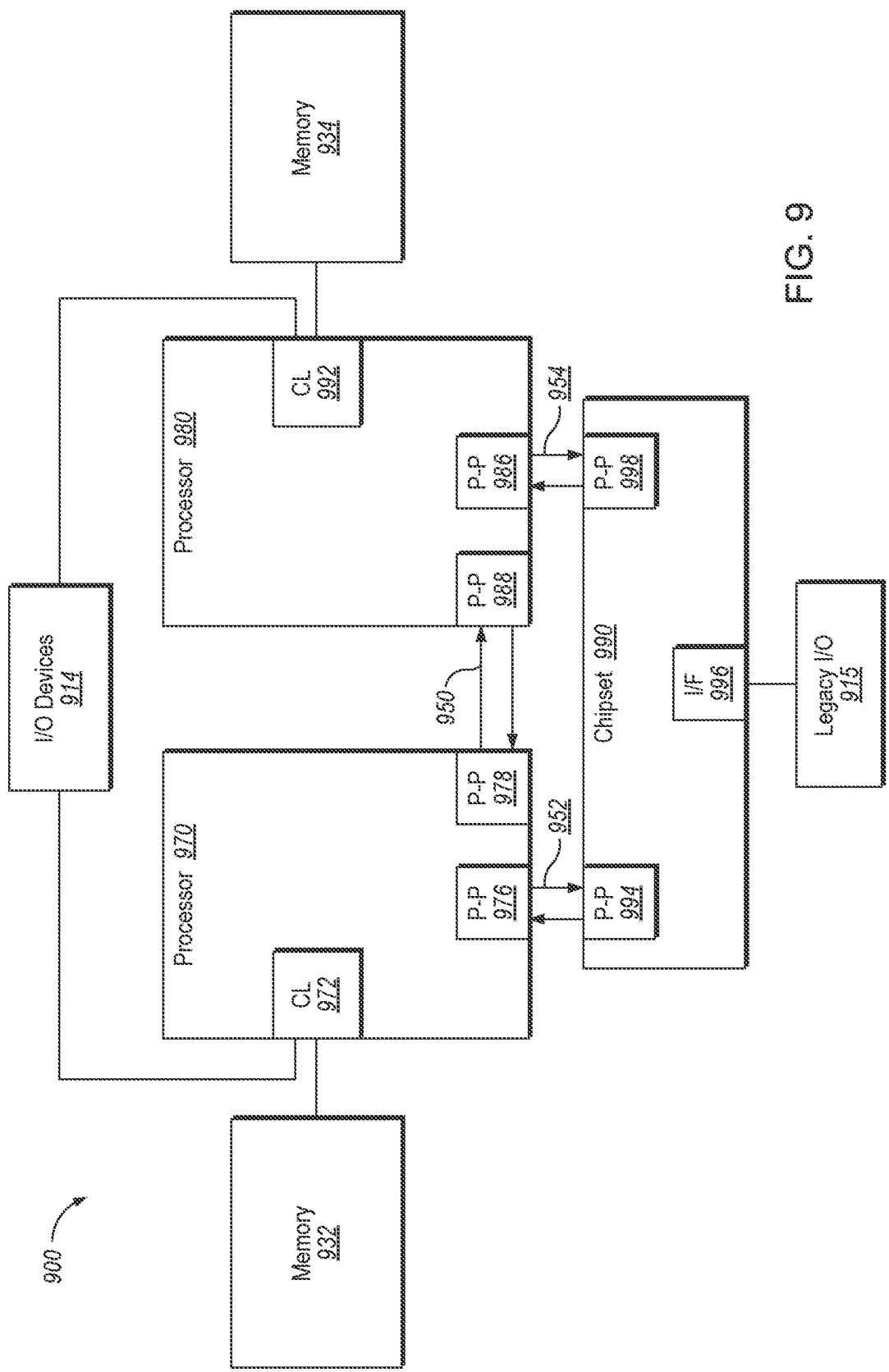
FIG. 9 is a block diagram illustrating a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
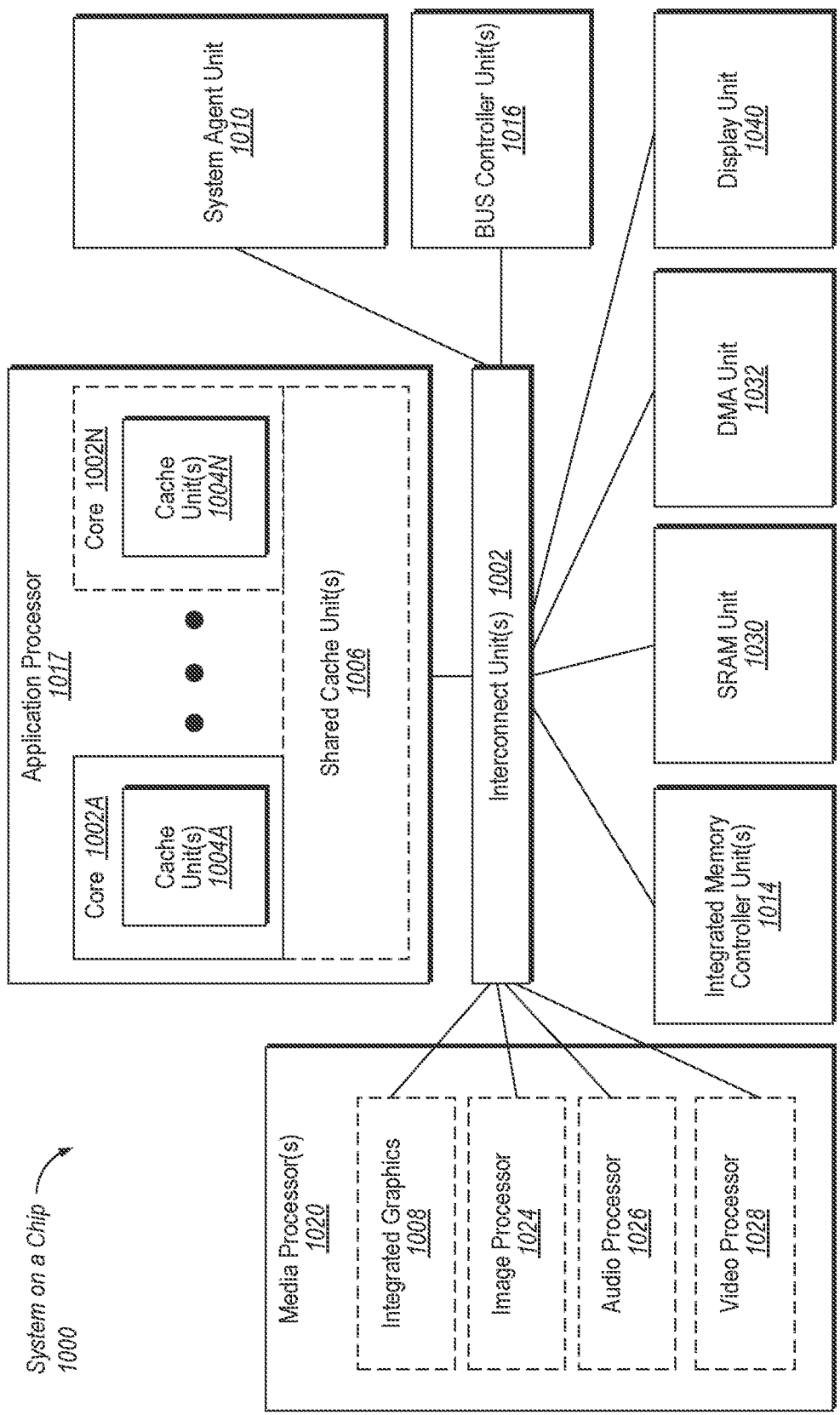
FIG. 10 is a block diagram illustrating a System-on-a-Chip (SoC) according to an embodiment.

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
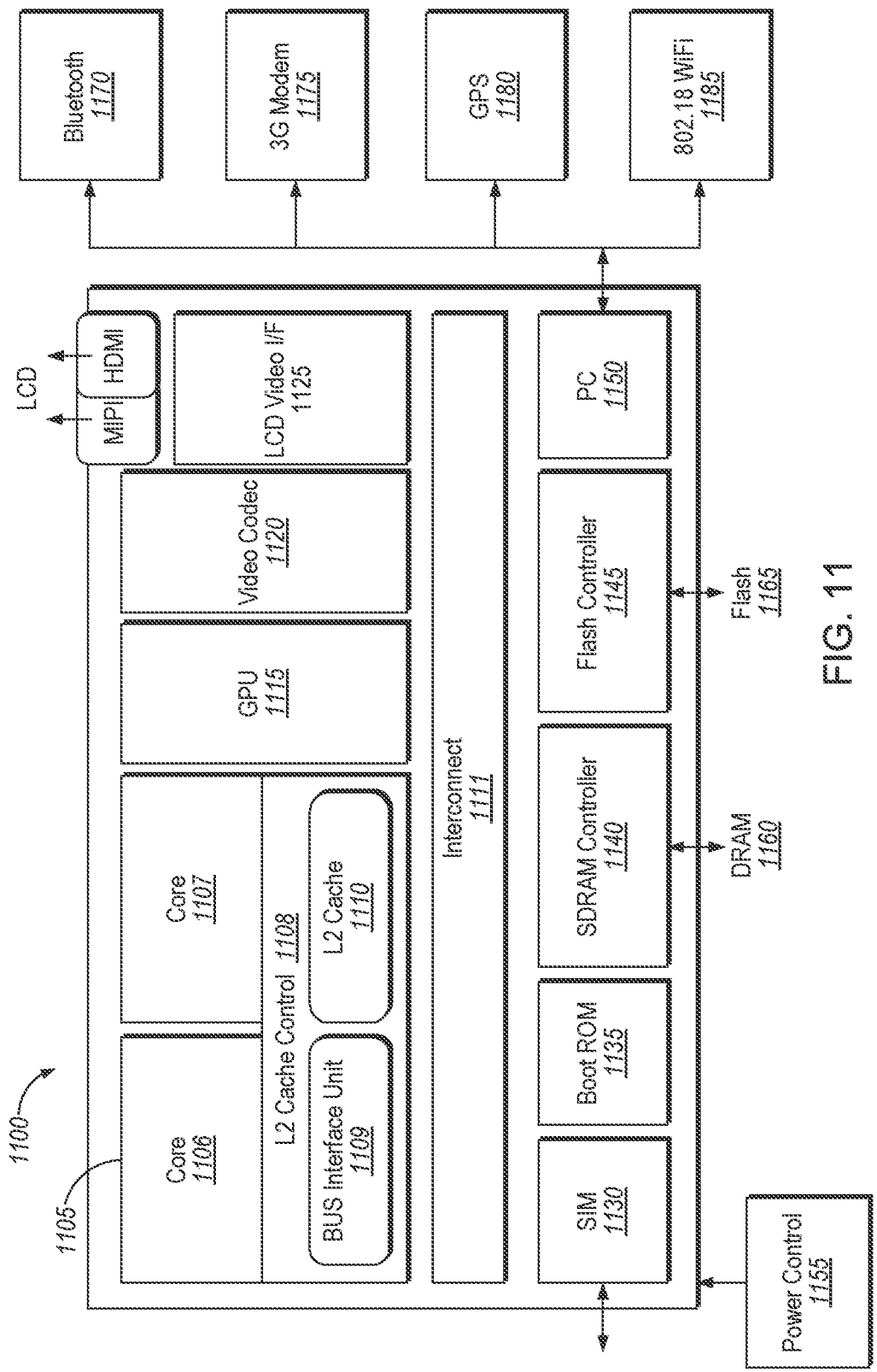
FIG. 11 is a block diagram illustrating a SoC design according to an embodiment.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
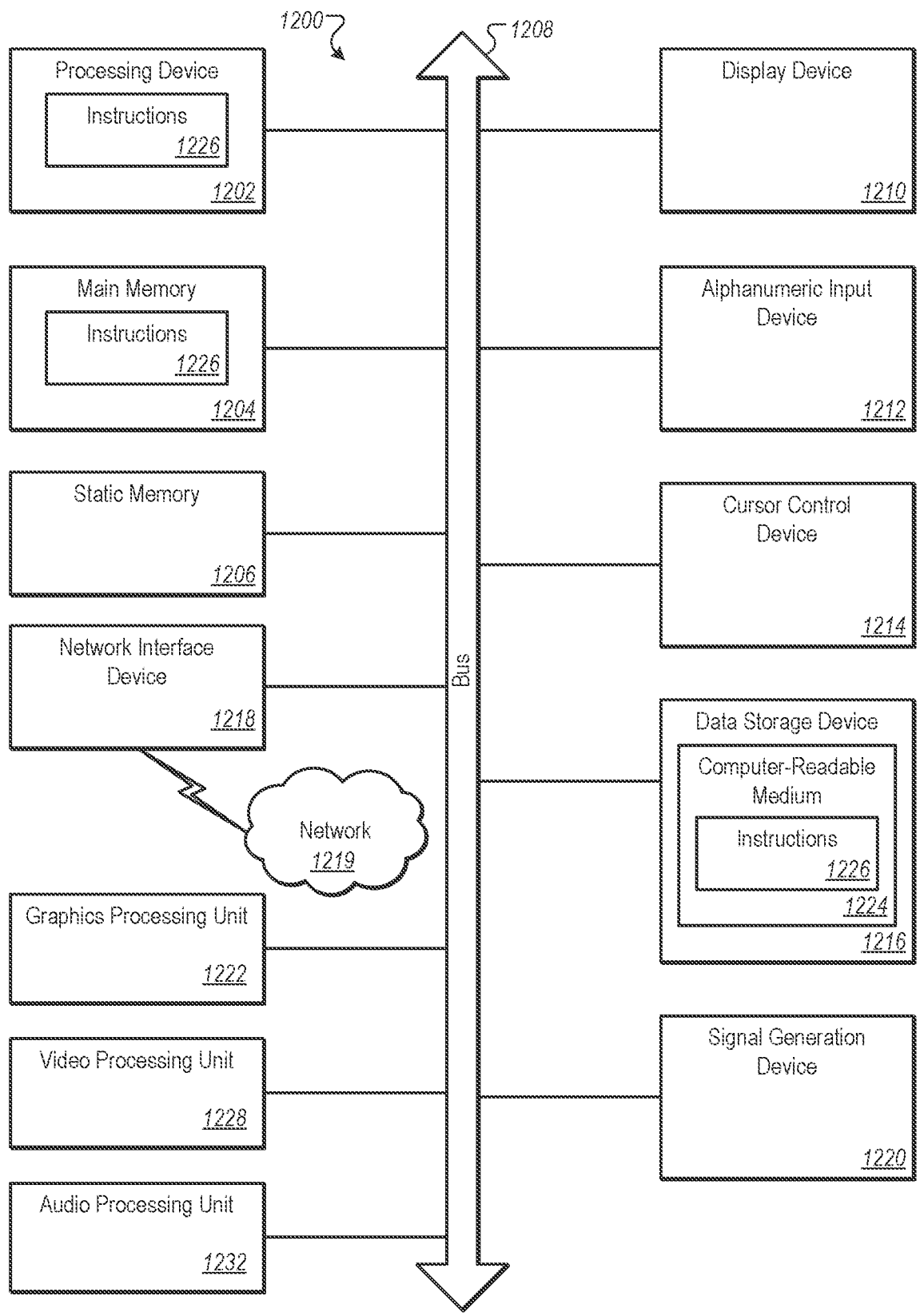
FIG. 12 illustrates a block diagram illustrating a computer system according to an embodiment.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIGS. 4-5.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker). Furthermore, computer system 1200 may include a graphics processing unit 1222, a video processing unit 1228, and an audio processing unit 1232.

The data storage device 1216 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processing device comprising: 1) a memory subsystem comprising a first memory subunit that includes a status register; 2) an execution engine unit coupled to the memory subsystem, the execution engine unit to: a) randomly select a load operation to monitor; b) determine a re-order buffer identifier of the load operation; and c) transmit the re-order buffer identifier to the memory subsystem; and wherein, d) responsive to receipt of the re-order buffer identifier, the first memory subunit is to store a piece of information, related to a status of the load operation, in the status register, and e) responsive to detection of retirement of the load operation, store the piece of information from the status register into a particular field of a record of a memory buffer, wherein the particular field is associated with the first memory subunit.

In Example 2, the processing device of Example 1, wherein the execution engine unit comprises 1) a re-order buffer that generates the re-order buffer identifier, the re-order buffer comprising: 2) a linear feedback shift register to generate a random number that is to select the load operation; and 3) an instruction latency counter to: a) start incrementing a counter value responsive to a dispatch of the load operation; and b) stop the counter value responsive to a write back of the load operation, from the memory subsystem, to the re-order buffer; and wherein, c) in response to detection of the retirement of the load operation, the first memory subunit is further to store the counter value in an access latency field of the record, which is accessible by software.

In Example 3, the processor of Example 2, wherein the execution engine unit further comprises 1) a unified scheduler to: a) dispatch the load operation for execution in response to the random selection of the load operation; and 2) forward the re-order buffer identifier to the re-order buffer in advance of detection of the write back, to signal to the re-order buffer that the load operation is being monitored.

In Example 4, the processor of Example 1, wherein the first memory subunit is a memory ordering buffer and the piece of information is an unknown store address.

In Example 5, the processor of Example 1, wherein the first memory subunit is further to write a data access address of the load operation into the record of the memory buffer, wherein the first memory subunit is a memory ordering buffer and the piece of information is whether the load operation is blocked due to an address collision with an earlier store operation.

In Example 6, the processor of Example 1, wherein the first memory subunit is a data translation lookaside buffer and the piece of information is one of presence or absence of a miss of the data translation lookaside buffer.

In Example 7, the processor of Example 1, wherein the first memory subunit is a data cache unit and the piece of information is a cache latency value of clock cycles for cache access.

In Example 8, the processor of Example 1, wherein the first memory subunit is further to write a value for an instruction pointer associated with the load operation into the record of the memory buffer.

Various implementations may have different combinations of the structural features described above. For instance, all optional features of the processors and methods described above may also be implemented with respect to a system described herein and specifics in the examples may be used anywhere in one or more implementations.

Example 9 is a system comprising: 1) a memory from which to retrieve data to complete load operations; 2) a core to execute microcode and software, the core comprising: 3) a memory subsystem coupled to the memory, wherein the memory subsystem comprises a plurality of memory subunits, each containing a status register; and 4) an execution engine unit coupled to the memory subsystem and to the core, the execution engine unit to: a) randomly select a load operation to monitor from the load operations, the load operation associated with a thread currently executed by the core; b) determine a re-order buffer identifier of the load operation; and c) transmit the re-order buffer identifier to the memory subsystem; wherein, d) responsive to receipt of the re-order buffer identifier, each of the plurality of memory subunits is to store a piece of information, related to a status of the load operation, in the status register corresponding to respective memory subunit; and e) wherein the core is to: f) detect retirement of the load operation; and g) in response to detection of the retirement of the load operation, store the piece of information from each status register into a corresponding field of a record of a memory buffer, wherein the record is accessible by the software as performance monitoring data.

In Example 10, the system of Example 9, wherein the execution engine unit comprises 1) a re-order buffer that generates the re-order buffer identifier, the re-order buffer comprising: 2) a linear feedback shift register to generate a random number that is to select the load operation; and 3) an instruction latency counter to: a) start incrementing a counter value responsive to a dispatch of the load operation; and b) stop the counter value responsive to a write back of the load operation, from the memory subsystem, to the re-order buffer; and wherein, c) in response to detection of the retirement of the load operation, the core is further to store the counter value in an access latency field of the record, which is accessible by the software.

In Example 11, the system of Example 10, wherein the execution engine unit further comprises 1) a unified scheduler to: a) dispatch the load operation in response to the random selection of the load operation; and b) forward the re-order buffer identifier to the re-order buffer in advance of detection of the write back, to signal to the re-order buffer that the write back is for the load operation that is being monitored by the instruction latency counter.

In Example 12, the system of Example 9, wherein the plurality of memory subunits comprises a memory ordering buffer, and in response to detecting the load operation is blocked by a preceding store forward operation with an overlapping linear address, the memory ordering buffer is to set a bit of the status register of the memory ordering buffer.

In Example 13, the system of Example 9, wherein the plurality of memory subunits comprises a memory ordering buffer, and in response to detecting the load operation is blocked by an unknown linear store address, the memory ordering buffer is to set a bit of the status register of the memory ordering buffer.

In Example 14, the system of Example 9, wherein the plurality of memory subunits comprises a data translation lookaside buffer for which the piece of information is one of a hit or a miss of the data translation lookaside buffer.

In Example 15, the system of Example 9, wherein the plurality of memory subunits comprises a data cache unit for which the piece of information is a cache latency value of clock cycles for cache access.

Various implementations may have different combinations of the structural features described above. For instance, all optional features of the processors and methods described above may also be implemented with respect to a system described herein and specifics in the examples may be used anywhere in one or more implementations.

Example 16 is an method comprising: a) randomly selecting, by an execution engine unit coupled to a memory subsystem, a load operation to monitor; b) determining, by the execution engine unit, a re-order buffer identifier of the load operation; c) transmitting, by the execution engine unit, the re-order buffer identifier to the memory subsystem; d) storing in a status register, by a first memory subunit of the memory subsystem responsive to receipt of the re-order buffer identifier, a piece of information related to a status of the load operation; e) detecting, by a processor that includes the execution engine unit, retirement of the load operation; and f) storing, by the processor in response to detecting the retirement of the load operation, the piece of information from the status register into a particular field of a record of a memory buffer, wherein the particular field is associated with the first memory subunit.

In Example 17, the method of Example 23, further comprising: a) starting, by the execution engine unit, to increment a counter value of an instruction latency counter responsive to a dispatch of the load operation; b) stopping, by the execution engine unit, the counter value responsive to a write back of the load operation, from the memory subsystem, to the re-order buffer; and c) storing, by the processor in response to the detecting the retirement of the load operation, the counter value in an access latency field of the record, which is accessible by software.

In Example 18, the method of Example 17, further comprising: a) dispatching, by a unified scheduler of the execution engine unit, the load operation in response to the random selection of the load operation; and b) forwarding, by the unified scheduler, the re-order buffer identifier to the re-order buffer in advance of detection of the write back, to signal to the re-order buffer that the write back is for the load operation that is being monitored by the instruction latency counter.

In Example 19, the method of Example 16, further comprising writing, by the processor, a value for an instruction pointer associated with the load operation into the record of the memory buffer.

In Example 20, the method of Example 16, wherein the first memory subunit is a memory ordering buffer and the piece of information is whether the load operation is blocked due to an address collision with an earlier store operation, the method further comprising writing, by the processor, a data access address of the load operation into the record of the memory buffer.

In Example 21, the method of Example 16, wherein the first memory subunit comprises a memory ordering buffer, and in response to detecting the load operation is blocked by a preceding store forward operation with an overlapping linear address, setting, by the memory ordering buffer, a bit of the status register of the memory ordering buffer.

In Example 22, the method of Example 16, wherein the first memory subunit comprises a memory ordering buffer, and in response to detecting the load operation is blocked by an unknown linear store address, setting, by the memory ordering buffer, a bit of the status register of the memory ordering buffer.

Various implementations may have different combinations of the structural features described above. For instance, all optional features of the processors and methods described above may also be implemented with respect to a system described herein and specifics in the examples may be used anywhere in one or more implementations.

Example 23 is a non-transitory computer-readable storage medium storing instructions that, when executed by a processing device, cause the instructions to perform a plurality of operations comprising: a) randomly selecting, by an execution engine unit coupled to a memory subsystem, a load operation to monitor; b) determining, by the execution engine unit, a re-order buffer identifier of the load operation; c) transmitting, by the execution engine unit, the re-order buffer identifier to the memory subsystem; d) storing in a status register, by a first memory subunit of the memory subsystem responsive to receipt of the re-order buffer identifier, a piece of information related to a status of the load operation; e) detecting, by a processor that includes the execution engine unit, retirement of the load operation; and f) storing, by the processor in response to detecting the retirement of the load operation, the piece of information from the status register into a particular field of a record of a memory buffer, wherein the particular field is associated with the first memory subunit.

In Example 24, the non-transitory computer-readable storage medium of Example 23, the operations further comprising: a) starting, by the execution engine unit, to increment a counter value of an instruction latency counter responsive to a dispatch of the load operation; b) stopping, by the execution engine unit, the counter value responsive to a write back of the load operation, from the memory subsystem, to the re-order buffer; and c) storing, by the processor in response to the detecting the retirement of the load operation, the counter value in an access latency field of the record, which is accessible by software.

In Example 25, the non-transitory computer-readable storage medium of Example 24, the operations further comprising: a) dispatching, by a unified scheduler of the execution engine unit, the load operation in response to the random selection of the load operation; and b) forwarding, by the unified scheduler, the re-order buffer identifier to the re-order buffer in advance of detection of the write back, to signal to the re-order buffer that the write back is for the load operation that is being monitored by the instruction latency counter.

In Example 26, the non-transitory computer-readable storage medium of Example 23, the operations further comprising writing, by the processor, a value for an instruction pointer associated with the load operation into the record of the memory buffer.

In Example 27, the non-transitory computer-readable storage medium of Example 23, wherein the first memory subunit is a memory ordering buffer and the piece of information is whether the load operation is blocked due to an address collision with an earlier store operation, the operations further comprising writing, by the processor, a data access address of the load operation into the record of the memory buffer.

In Example 28, the non-transitory computer-readable storage medium of Example 23, wherein the first memory subunit comprises a memory ordering buffer, and in response to detecting the load operation is blocked by a preceding store forward operation with an overlapping linear address, the operations further comprising setting, by the memory ordering buffer, a bit of the status register of the memory ordering buffer.

In Example 29, the non-transitory computer-readable storage medium of Example 23, wherein the first memory subunit comprises a memory ordering buffer, and in response to detecting the load operation is blocked by an unknown linear store address, the operations further comprising setting, by the memory ordering buffer, a bit of the status register of the memory ordering buffer.

Various implementations may have different combinations of the structural features described above. For instance, all optional features of the processors and methods described above may also be implemented with respect to a system described herein and specifics in the examples may be used anywhere in one or more implementations.

Example 30 is a system comprising: a) means for randomly selecting a load operation to monitor; b) means for determining a re-order buffer identifier of the load operation; c) means for transmitting the re-order buffer identifier to a memory subsystem; d) means for storing, by a first memory subunit of the memory subsystem responsive to receipt of the re-order buffer identifier, a piece of information related to a status of the load operation; e) means for detecting retirement of the load operation; and f) means for storing, in response to detecting the retirement of the load operation, the piece of information into a particular field of a record of a memory buffer, wherein the particular field is associated with the first memory subunit.

In Example 31, the system of Example 30, further comprising: a) means for starting to increment a counter value of an instruction latency counter responsive to a dispatch of the load operation; b) means for stopping the counter value responsive to a write back of the load operation, from the memory subsystem, to the re-order buffer; and c) means for storing, in response to the detecting the retirement of the load operation, the counter value in an access latency field of the record, which is accessible by software.

In Example 32, the system of Example 31, further comprising: a) means for dispatching the load operation in response to the random selection of the load operation; and b) means for forwarding the re-order buffer identifier to the re-order buffer in advance of detection of the write back, to signal to the re-order buffer that the write back is for the load operation that is being monitored by the instruction latency counter.

In Example 33, the system of Example 30, further comprising means for writing a value for an instruction pointer associated with the load operation into the record of the memory buffer.

In Example 34, the system of Example 30, wherein the first memory subunit is a memory ordering buffer and the piece of information is whether the load operation is blocked due to an address collision with an earlier store operation, the method further comprising means for writing a data access address of the load operation into the record of the memory buffer.

In Example 35, the system of Example 30, wherein the first memory subunit comprises a memory ordering buffer, and in response to detecting the load operation is blocked by a preceding store forward operation with an overlapping linear address, means for setting, by the memory ordering buffer, a bit of the status register of the memory ordering buffer.

In Example 36, the system of Example 30, wherein the first memory subunit comprises a memory ordering buffer, and in response to detecting the load operation is blocked by an unknown linear store address, means for setting, by the memory ordering buffer, a bit of the status register of the memory ordering buffer.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
a memory subsystem including a data cache, the memory subsystem to process a load operation; and
load latency hardware including a latency counter, the load latency hardware to record performance monitoring information including an access address associated with the load operation, a data block indicator to indicate whether the load operation was blocked since its data could not be forwarded from a preceding store, and an address block indicator to indicate whether the load operation was blocked due to a potential address conflict with a preceding store.

2. The apparatus of claim 1, wherein the performance monitoring information also includes an instruction access latency associated with the load operation.

3. The apparatus of claim 1, wherein the performance monitoring information also includes a cache access latency associated with the load operation.

4. The apparatus of claim 1, wherein the load operation is to be randomly selected.

5. A method comprising:
processing, by a memory subsystem of a hardware processor, the memory subsystem including a data cache, a load operation;
recording, by load latency hardware of the processor, the load latency hardware including a latency counter, performance monitoring information including an access address associated with the load operation, a data block indicator to indicate whether the load operation was blocked since its data could not be forwarded from a preceding store, and an address block indicator to indicate whether the load operation was blocked due to a potential address conflict with a preceding store.

6. The method of claim 5, wherein the performance monitoring information also includes an instruction access latency associated with the load operation.

7. The method of claim 5, wherein the performance monitoring information also includes a cache access latency associated with the load operation.

8. The method of claim 5, further comprising randomly selecting the load operation.

9. A system comprising:
a memory; and
a processor including:
a memory subsystem including a data cache, the memory subsystem to process a load operation; and
load latency hardware including a latency counter, the load latency hardware to record performance monitoring information including an access address associated with the load operation, a data block indicator to indicate whether the load operation was blocked since its data could not be forwarded from a preceding store, and an address block indicator to indicate whether the load operation was blocked due to a potential address conflict with a preceding store.

10. The system of claim 9, wherein the performance monitoring information also includes an instruction access latency associated with the load operation.

11. The system of claim 9, wherein the performance monitoring information also includes a cache access latency associated with the load operation.

12. The system of claim 9, wherein the load operation is to be randomly selected.

* * * * *